(12) United States Patent
Newman

(10) Patent No.: US 6,750,761 B1
(45) Date of Patent: Jun. 15, 2004

(54) METHOD FOR MONITORING TIRE PARAMETERS

(75) Inventor: Robert A. Newman, El Paso, TX (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/374,135

(22) Filed: Feb. 25, 2003

(51) Int. Cl.[7] .............................................. B60C 23/02
(52) U.S. Cl. ........................ 340/442; 340/438; 340/446; 340/447; 340/448; 340/449; 340/825.46; 340/825.49; 73/146.5
(58) Field of Search ................................ 340/438, 442, 340/445–449, 825.36, 825.49; 73/146.5

(56) References Cited

U.S. PATENT DOCUMENTS

| | | | |
|---|---|---|---|
| 5,825,286 A | * | 10/1998 | Coulthard .................... 340/447 |
| 6,243,007 B1 | * | 6/2001 | McLaughlin et al. ........ 340/447 |
| 6,278,363 B1 | * | 8/2001 | Bezek et al. ................. 340/442 |
| 6,414,592 B1 | | 7/2002 | Dixit et al. ................... 340/447 |

* cited by examiner

*Primary Examiner*—Daniel J. Wu
*Assistant Examiner*—Samuel J. Walk
(74) *Attorney, Agent, or Firm*—Jimmy L. Funke

(57) ABSTRACT

A method is used to identify a plurality of tires of a motor vehicle by location allowing a sensed parameter of each of the plurality of tires to be monitored. The method incorporates the use of a central receiver, a plurality of sensors, a plurality of transmitters and a mobile training unit. The method includes the steps of moving the mobile training unit to a location adjacent one of the plurality of tires. Once there, the operator inputs manually the location of one of the plurality of tires with respect to the motor vehicle. The mobile training unit transmits the location to the adjacent sensor. The sensor identification is paired with the location in the sensor to create paired data. The method concludes with transmitting the paired data from the sensor to the central receiver allowing the central receiver to identify one of the plurality of tires by the paired data when the transmitter of one of the plurality of tires transmits a signal based on the identification signal and the parameter sensed by one of the plurality of sensors.

8 Claims, 6 Drawing Sheets

METHOD FOR MONITORING TIRE PARAMETERS

BACKGROUND ART

1. Field of the Invention

The invention relates to a method for monitoring parameters of tires of a motor vehicle. More specifically, the invention relates to a method for monitoring parameters of each tire of the motor vehicle in an energy efficient manner.

2. Description of the Related Art

Systems have been developed to monitor parameters of tires for motor vehicles. These systems use sensors mounted inside the tires of the motor vehicle to directly measure the parameters desired. These sensors then transmit the information to a receiver on the motor vehicle to be displayed for the operator of the motor vehicle. Because tires are rotated and periodically changed, a common problem with these systems is identifying from which tire location the transmission is emanating.

Methods for determining sensor location have been devised. Many of these methods involve having the receiver initiate a training mode. In the training mode, a controller transmits to each of the sensors inside the tires to transmit a signal to the receiver in a predetermined order, e.g., right-front, left-front, left-rear and right-rear. The operator of the vehicle must go to each tire and initiate the transmission of the signal from that particular tire. Requiring the operator to follow a particular tire transmission pattern when training the system oftentimes leads to errors. This is because the receiver receives four different signals and operates under the assumption that the transmission of those signals was in the proper order.

U.S. Pat. No. 6,414,592 discloses one solution for the training mode of the monitoring system. In this reference, a manually actuated transmitter creates a manual input location identification. The sensor within the tire receives the manually input location identification and stores that information and transmits this information every time the sensor is queried. When the position of the tire is changed, the manually input location identification is changed at that time. This system operates when the sensor identifies itself, its location and then transmits the parameter it senses. In this reference, the sensed parameter is pressure.

Because the sensor contemplated in this reference is located within the tire, it relies on a battery for its power. Transmitting the location of the sensor consumes battery power and is often redundant. More specifically, the sensor transmits its location every time it transmits a parameter signal, regardless of whether the tire has been rotated to a new position or not. Should the battery exhaust its potential, the tire must be removed from the wheel and the battery must be replaced. Operators of motor vehicles tend to consider this system non-operational due to its high maintenance and the time and cost associated with replacing the batteries.

SUMMARY OF THE INVENTION

A method identifies a plurality of tires of a motor vehicle by location to sense a parameter of each of the plurality of tires. The method incorporates the use of a central receiver, a plurality of sensors, a plurality of transmitters and a mobile training unit. The method includes the steps of moving the mobile training unit to a location adjacent one of the plurality of tires. Once there, the operator inputs manually the location of one of the plurality of tires with respect to the motor vehicle.

A sensor identification is retrieved from one of the plurality of sensors at the one of the plurality of tires. The location information and the sensor identification for that particular sensor are paired together to create paired data. The paired data is then transmitted from the sensor to the central receiver allowing the central receiver to identify one of the plurality of tires by the paired data when the transmitter of the one of the plurality of tires transmits a signal based on the identification signal and the parameter sensed by the one of the plurality of sensors.

BRIEF DESCRIPTION OF THE DRAWINGS

Advantages of the invention will be readily appreciated as the same becomes better understood by reference to the following detailed description when considered in connection with the accompanying drawings, wherein.

DETAILED DESCRIPTION OF THE PREFERRED EMBODIMENT

Figure 1:
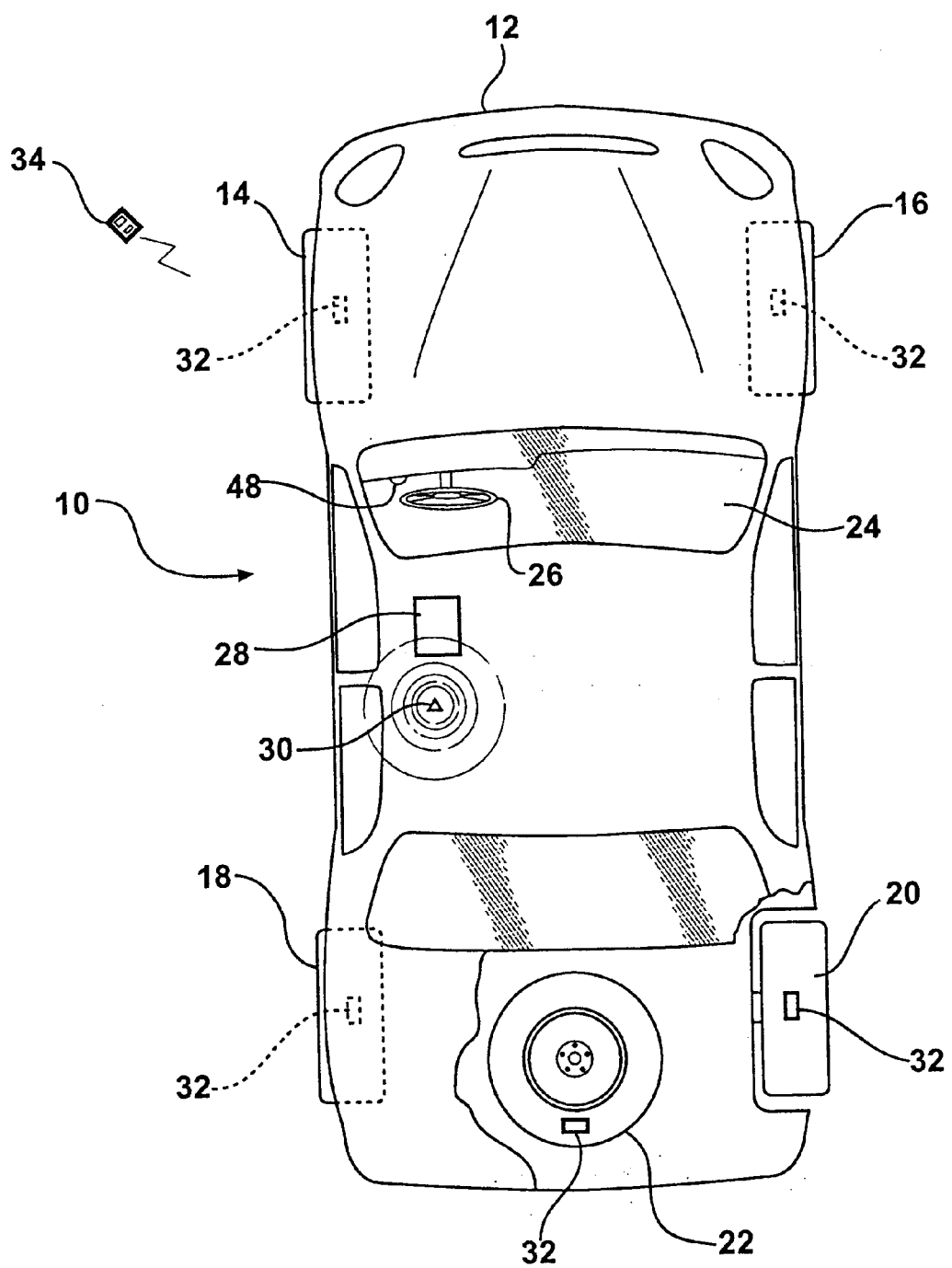
FIG. 1 is a top view of a motor vehicle, partially cut away, utilizing the inventive method.

Referring to FIG. 1, a monitoring assembly is generally indicated at 10. The monitoring assembly 10 is hosted by a motor vehicle 12. The motor vehicle 12 includes a front driver side tire 14, a front passenger side tire 16, a rear driver side tire 18, a rear passenger side tire 20 and a spare tire 22 (the tires 14–22). The motor vehicle 12 also includes a passenger compartment 24 having a steering wheel 26 disposed in front of a driver seat (not shown).

The monitoring assembly 10 includes a central receiver 28 and an antenna 30 electrically connected thereto. It should be appreciated by those skilled in the art that the central receiver 28 and antenna 30 are graphically shown in FIG. 1 at a location proximate the driver seat and steering wheel 26. Other locations for the central receiver 28 and antenna 30 within the motor vehicle 12 may be acceptable, depending on the design of the monitoring assembly 10. The central receiver 28 receives signals from the antenna 30.

The monitoring assembly 10 also includes a plurality of sensors 32, each associated with one of the tires 14–22. Each of the plurality of sensors 32 is located within each of the tires 14–22 allowing it to sense a parameter of each of the tires 14–22. A non-exhaustive list of parameters that may be sensed by the sensors 32 include pressure and temperature.

The monitoring assembly 10 also includes a mobile training unit 34. The mobile training unit 34 is selectively connectable with the monitoring assembly 10 through a wireless protocol allowing it to move about the motor vehicle 12 while transmitting data to the central receiver 28 through the antenna 30.

Figure 4:
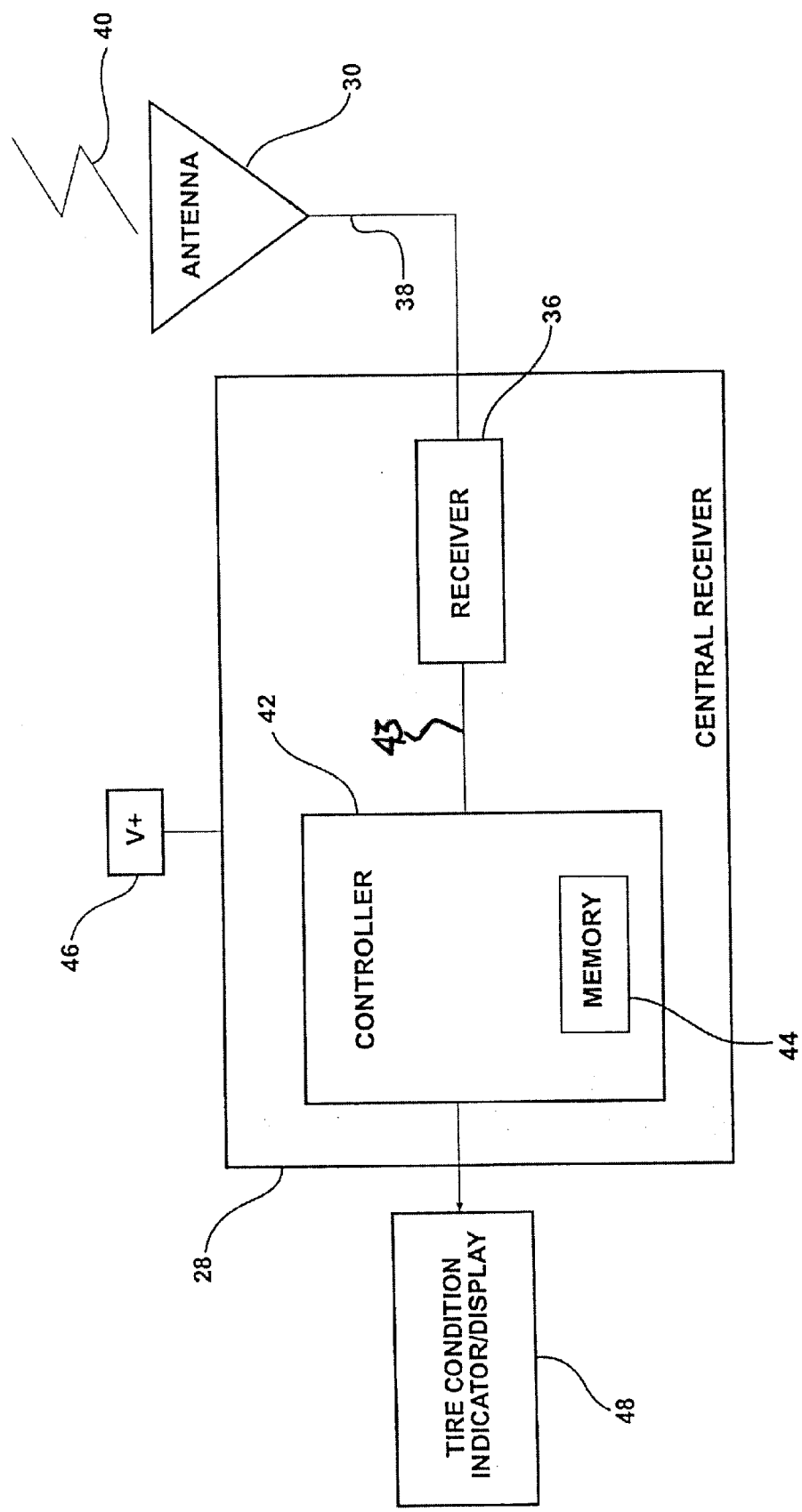
FIG. 4 is a block diagram of the central receiver located within the motor vehicle.

Referring to FIG. 4, the central receiver 28 is shown in greater detail. The central receiver 28 includes a receiver 36 that is electrically connected to the antenna 30 via conductor 38. The receiver 36 receives signals 40, then transmits the signals 40 to a controller 42 via an electrical conductor 43. The controller 42 includes memory 44, discussed in greater detail subsequently. The central receiver 28 is powered by a power source 46. The power source 46 is graphically represented and may be a battery, transformer, or a connection to a power generating source, e.g., the alternator of the motor vehicle 12.

Depending on the signals 40 received by the central receiver 28, an output is generated by the controller 42 and transmitted to a tire condition indicator display 48. Referring back to FIG. 1, the tire condition indicator display 48 is disposed adjacent the steering wheel 26 at a location visible by the operator of the motor vehicle 12. While the tire condition indicator display 48 is contemplated as a visual indicator, it should be appreciated by those skilled in the art that an audible indication may be included with the tire condition indicator display 48.

Figure 3:
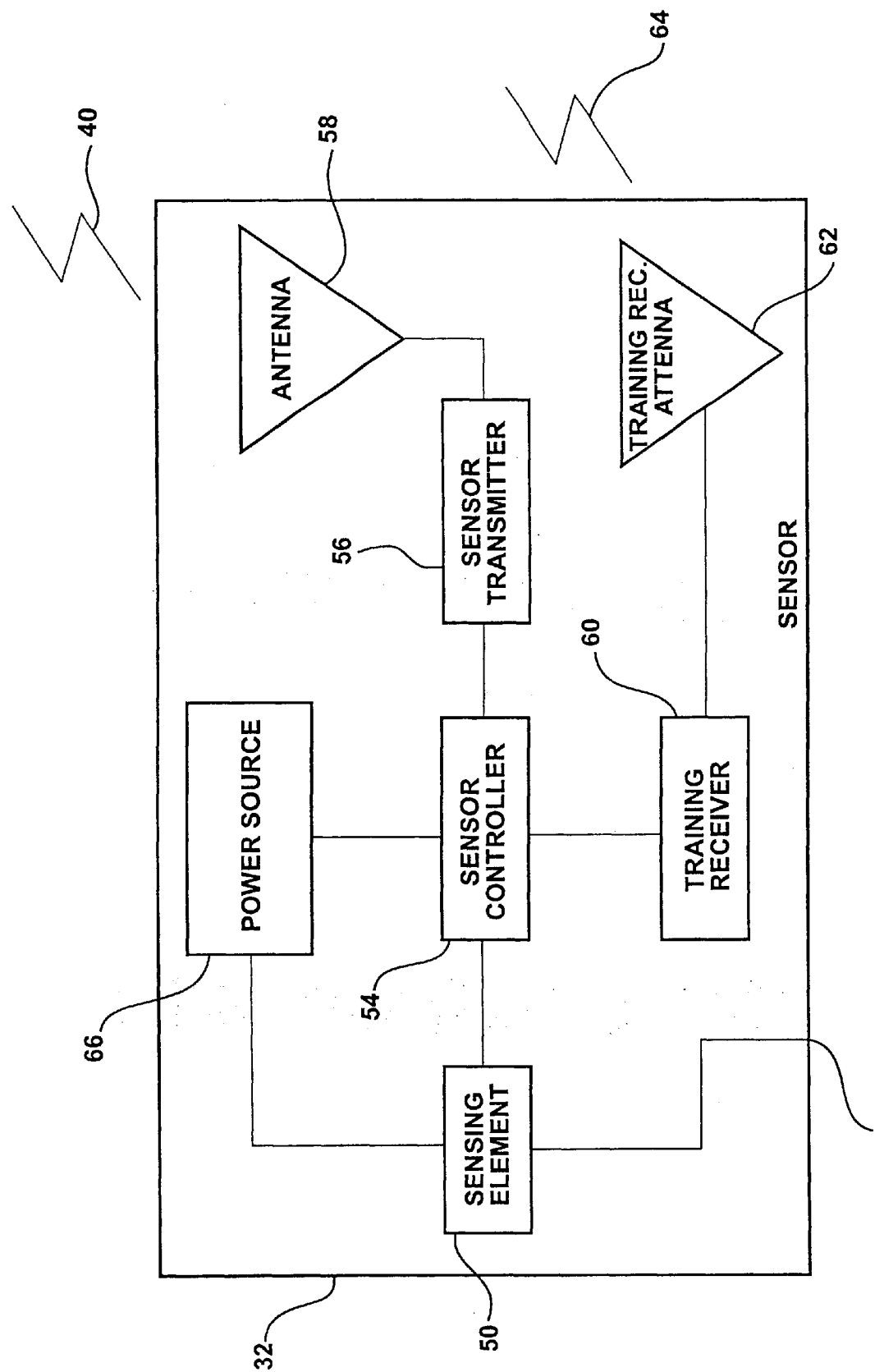
FIG. 3 is a block diagram of the sensor and transmitter located in each tire of the motor vehicle.

Referring to FIG. 3, one of the plurality of sensors 32 is shown in greater detail. Each of the sensors 32, mounted to the interior of the tires 14–22 through methods known in the art, includes a sensing element 50. The sensing element 50 receives conditions in the tires 14–22 through a port 52. In one example, the port 52 would be an opening in a sensor housing leading to a diaphragm at the sensing element 50 allowing the sensing element 50 to sense the pressure of the host tire. There may be more than one sensing element 50 in each sensor 32 should more parameters be monitored.

The sensing element 50 transmits a signal of the parameter sensed by the sensing element 50 to a sensor controller 54. The sensor controller 54 generates a signal based on the signal received from the sensing element 50 and transmits that signal to a sensor transmitter 56. The sensor transmitter 56 transmits the signal 40 using a sensor transmitting antenna 58.

The sensor 32 also includes a training receiver 60 that is also electrically connected to the sensor controller 54. The training receiver 60 receives signals from a training receiver antenna 62. The training receiver antenna 62 receives a trainer signal 64, discussed in greater detail subsequently.

The sensor 32 also includes an internal power source 66 that provides power to the sensing element 50 and the sensor controller 54. The internal power source 66 is the only source of energy available to the sensor 32. Therefore, the internal power source 66 must be sufficient to supply power to the sensor 32 through the life of the sensor 32, which should equal or exceed the life of the tire 14–22. If the internal power source 66 is not adequate, the sensor 32 will have to be changed resulting in the dismounting of the tire 14–22 from its wheel prematurely.

Figure 2:
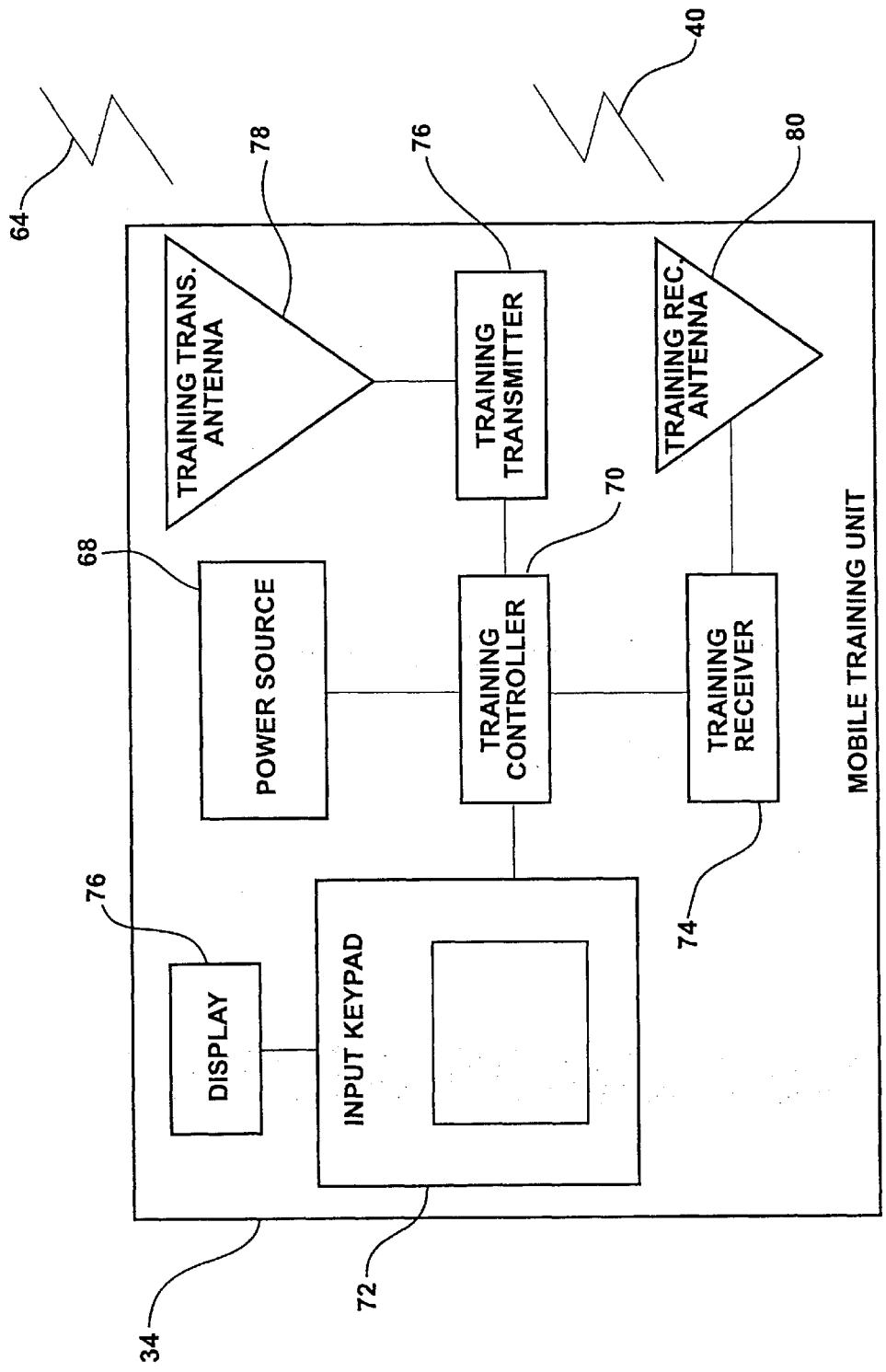
FIG. 2 is a block diagram of the mobile training unit.

Referring to FIG. 2, the mobile training unit 34 is shown in greater detail. The mobile training unit 34 is a handheld device designed to move to locations disposed adjacent each of the tires 14–22. The mobile training unit 34 includes a power source 68 that may be batteries, rechargeable batteries and the like. The power source 68 provides power to a training controller 70. The training controller 70 receives inputs from an input keypad 72 and a training receiver 74. The training controller 70 transmits information to a display 76, via the input keypad 72, and a training transmitter 76. The training transmitter 76 transmits the trainer signals 64 through a training transmission antenna 78, whereas the training receiver 74 receives signals 40 from a training receiving antenna 80.

Figure 5A:
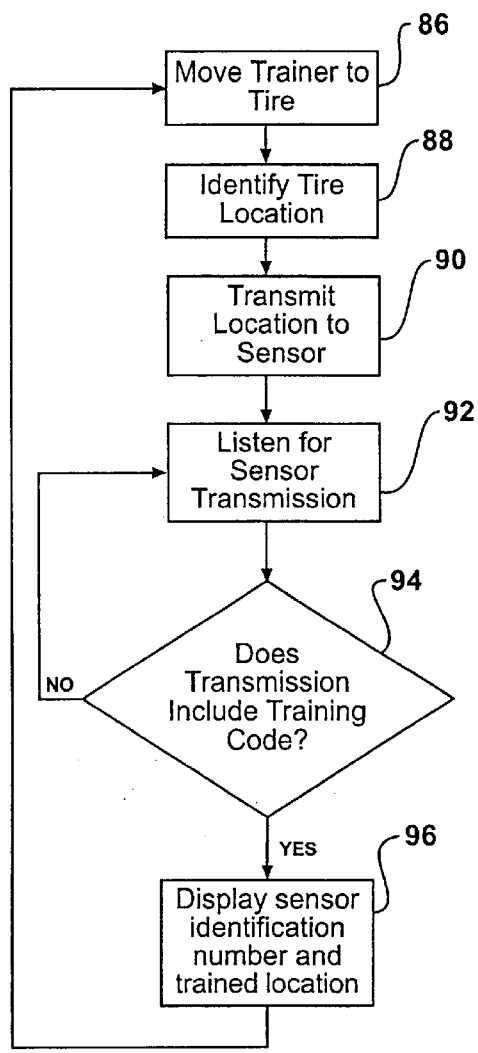
FIGS. 5A through 5C are logic diagrams for one embodiment of the inventive method.
Figure 5B:
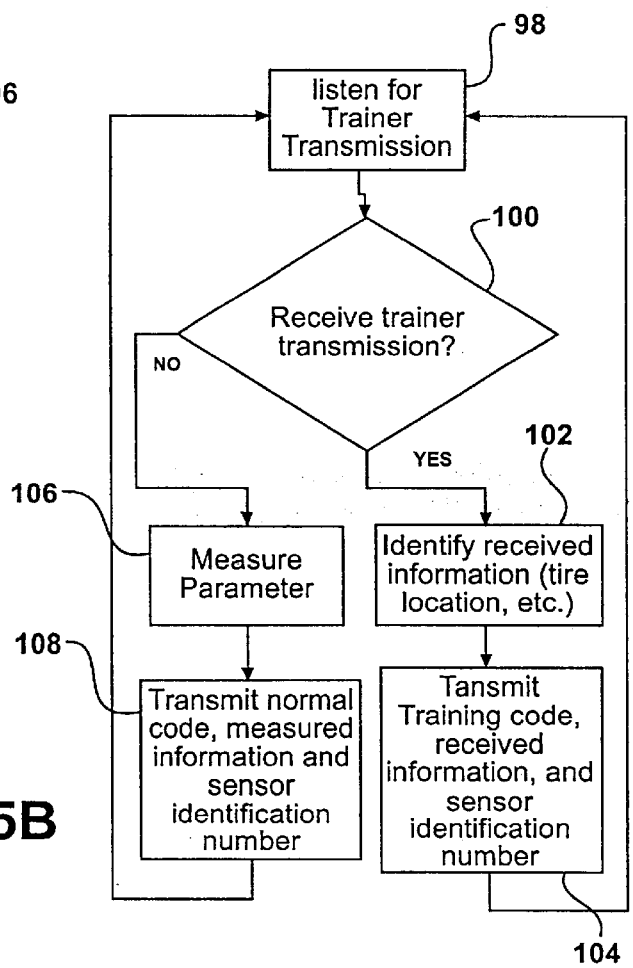
Figure 5C:
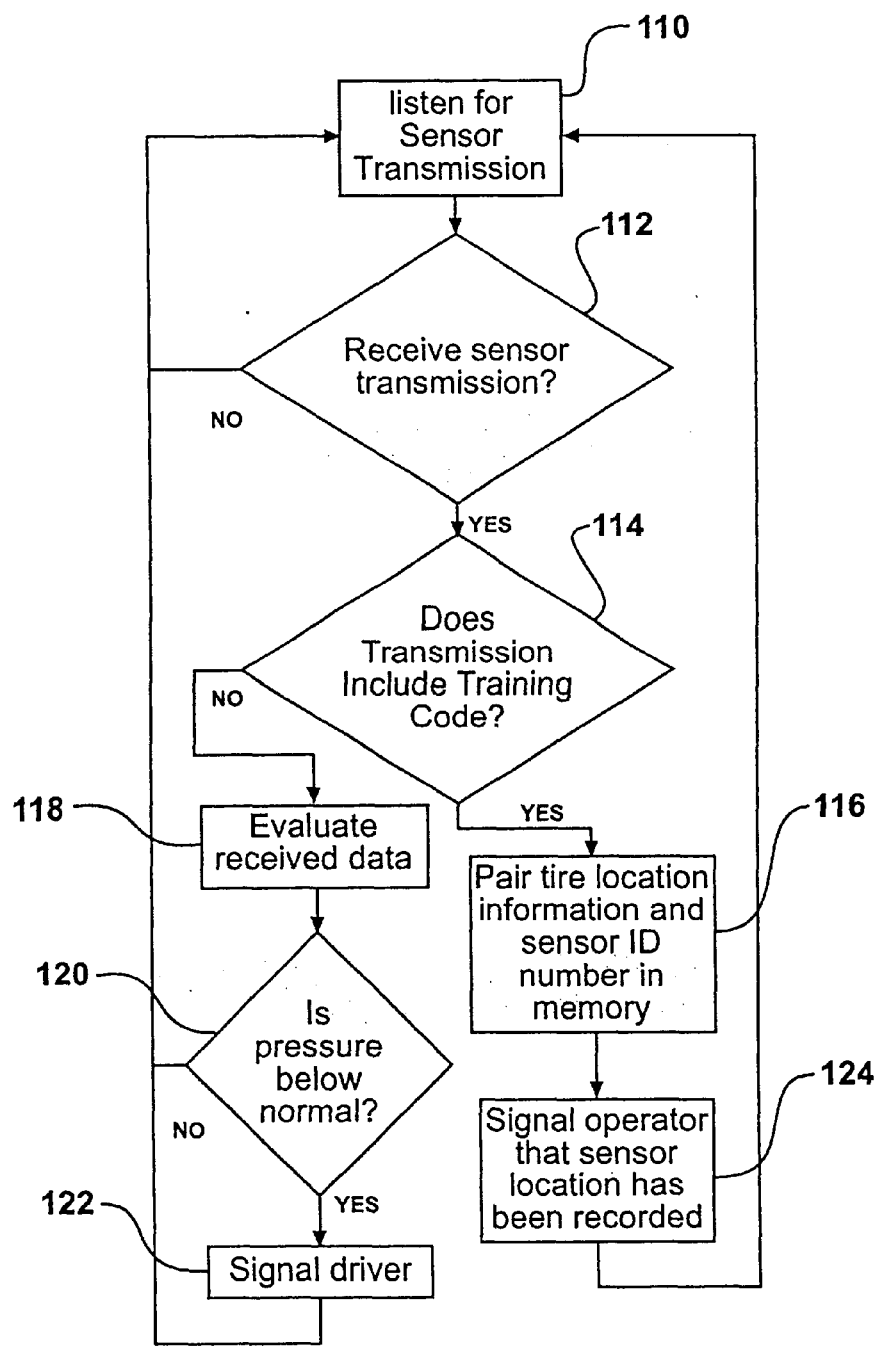

Referring to FIGS. 5A through 5C, logic diagrams of the inventive method are shown. The method shown in FIG. 5A represent the method utilized by the mobile training unit 34. The method begins at 86. The method would begin when the ignition is operated to power the motor vehicle 12. The mobile training unit 34 is moved to one of the tires 14–22. This step occurs at 86. The location of the tire 14–22 that is being trained is identified at 88. Identification occurs by the operator of the mobile training unit 34 manually inputting the location of the tire being trained using the input keypad 72. The input keypad 72 may have as few as five buttons, each identifying one of the five standard locations in which the tires 14–22 are located. The input strokes into the input keypad 72 are displayed at 76 ensuring the operator has an opportunity to correct any accidental miskeying.

Once the tire location is entered, it is forwarded to the sensor 32 in the tire 14–22 at 90. The mobile training unit 34 then determines whether the sensor 32 responds by return transmission at 92. If received, it is determined at 94 whether the transmission from the sensor 32 includes the training code. If so, the mobile training unit 34 displays an identification number associated with the trained location at 96 and waits for the mobile training unit 34 to be moved to another tire 14–22, (step 86).

FIG. 5B represents the method of operation for each of the plurality of sensors 32. It begins with the sensor 32 resting in standby mode until it receives a transmission from the mobile training unit 34. This listening step occurs at 98. It is determined whether the sensor 32 has received a transmission from the mobile training unit 34 at 100. If the sensor 32 does not receive such a transmission, the sensor 32 operates in a normal manner in which it measure the parameter it is designed to do at 106. Once measured, it transmits the code, measured information and sensor identification number to the receiver 36 at 108.

If the sensor 32 does receive a transmission from the mobile training unit 34 at 100, it accepts the identification information transmitted by the mobile training unit 34 at 102. It then transmits to the mobile training unit 34 the training code, the location information and the sensor identification number at 104.

Referring specifically to FIG. 5C, the receiver 36 is shown to operate a method shown. This method begins at 110 with the receiver 36 waiting for a signal from a sensor 32. It is determined at 112 whether a signal is received. If not, the method is looped back to the start of the method at 110 and waits to receive a signal from one of the sensors 32.

If a signal is received, it is determined at 114 whether a training code is a part of the transmission. If so, it pairs the tire location information and the identification information of the sensor 32 in memory 44. The method then loops back to the beginning at 10 where the receiver 36 awaits a new signal from any one of the plurality of sensors 32.

If the transmission received at 114 does not include a training code as a part thereof, it begins to evaluate the data transmitted thereby at 118. It determines whether the parameter is below a predetermined level at 120. In FIG. 5C, the parameter is pressure. It should be appreciated by those skilled in the art that other parameters of the tires 14–22 may be sensed depending on the data desired to be measured. If the parameter is not below the predetermined level, the method loops back to the beginning at 110 and waits for a new signal from one of the plurality of sensors 32. If the data received indicates a parameter is below a predetermined amount, the driver of the motor vehicle 12 is notified by generating a warning signal at 122. The warning signal is generated by the controller 42 and displayed or emitted from the tire condition indicator display 48. Once the warning signal is generated, the method is looped back to step 110 allowing the central receiver 28 to receive data from any one of the plurality of sensors 32.

The receiver 36 then cycles back to the beginning of the method where it awaits another signal from one of the sensors 32 at 110. The receiver 36 will cycle through all of signals received from all of the plurality of sensors 32 as they are received thereby.

As the central receiver 28 receives the paired data from each sensor 32, the central receiver 28 can store the paired data in the memory 44. Therefore, the location of each of the sensors 32 is not stored at the sensor 32, but at the central receiver 44. This eliminates the need for each of the plurality of sensors 32 to transmit its respective location every time the sensor may transmit data relating to the condition of each of the tires 14–22. When a location is stored, the central receiver 44 signals the operator by honking the horn, flashing the lights, or other obvious means so that the operator will know that the central receiver 44 has indeed received the information.

If the transmission received does include a training code, the location information and sensor identification that defines the paired data is stored into memory at 116. The method then notifies the operator that the sensor location has been recorded at 124 in a manner similar to that which as discussed above for the notification step 122.

The invention has been described in an illustrative manner. It is to be understood that the terminology, which has been used, is intended to be in the nature of words of description rather than of limitation.

Many modifications and variations of the invention are possible in light of the above teachings. Therefore, within the scope of the appended claims, the invention may be practiced other than as specifically described.

What is claimed:

1. A method for identifying a plurality of tires of a motor vehicle by location to sense a parameter of each of the plurality of tires using a central receiver, a plurality of sensors, a plurality of transmitters and a mobile training unit, the method comprising the steps of:

moving the mobile training unit to a location adjacent one of the plurality of tires;

inputting manually into the mobile training unit location information of one of the plurality of tires with respect to the motor vehicle;

retrieving a sensor identification from one of the plurality of sensors at the one of the plurality of tires;

pairing the location information with the sensor identification in the sensor to create paired data; and transmitting the paired data from the mobile training unit to the central receiver;

storing the paired data at the central receiver; and using the central receiver to identify the location of one of the plurality of tires by the paired data after the transmitter of one of the plurality of tires transmits a signal including only the identification signal and the parameter sensed by one of the plurality of sensors.

2. A method as set forth in claim 1 including the step of locating the mobile training unit at locations adjacent each of the remaining tires of the plurality of tires.

3. A method as set forth in claim 2 including the step of creating paired data for each of the plurality of tires prior to the step of transmitting the paired data to the central receiver for storage thereby.

4. A method as set forth in claim 3 including the step of each of the plurality of sensors sensing the parameter in each of the plurality of tires, respectively, to create a plurality of sensed signals.

5. A method as set forth in claim 4 including the step of each of the transmitters transmitting each of the plurality of identification signals and each of the plurality of sensed signals, respectively, to the central receiver.

6. A method as set forth in claim 5 including the step of indicating to an operator of the motor vehicle the parameter of one of said plurality of tires when the value changes a predetermined amount.

7. A method as set forth in claim 6 wherein the parameter is temperature.

8. A method as set forth in claim 6 wherein the parameter is tire pressure.

* * * * *